(12) United States Patent
Kim

(10) Patent No.: US 8,898,397 B2
(45) Date of Patent: Nov. 25, 2014

(54) MEMORY AND PROCESS SHARING ACROSS MULTIPLE CHIPSETS VIA INPUT/OUTPUT WITH VIRTUALIZATION

(76) Inventor: Moon J. Kim, Wappingers Falls, NY (US)

(*) Notice: Subject to any disclaimer, the term of this patent is extended or adjusted under 35 U.S.C. 154(b) by 276 days.

(21) Appl. No.: 13/444,025

(22) Filed: Apr. 11, 2012

(65) Prior Publication Data

US 2013/0275687 A1 Oct. 17, 2013

(51) Int. Cl.
*G06F 12/00* (2006.01)

(52) U.S. Cl.
USPC ............ 711/148; 711/152; 711/163; 711/202; 711/203

(58) Field of Classification Search
CPC .............................. G06F 12/0806; G06F 12/10
USPC .......................... 711/148, 152, 163, 202, 203
See application file for complete search history.

(56) References Cited

U.S. PATENT DOCUMENTS

| | | | |
|---|---|---|---|
| 7,552,436 B2 | 6/2009 | Brice, Jr. et al. | |
| 7,797,512 B1 | 9/2010 | Cheng et al. | |
| 7,849,327 B2 | 12/2010 | Leung et al. | |
| 7,873,776 B2 | 1/2011 | Hetherington et al. | |
| 7,984,122 B2 | 7/2011 | Titus | |
| 2002/0133673 A1* | 9/2002 | Jeddeloh | 711/138 |
| 2003/0177317 A1* | 9/2003 | Anderson et al. | 711/146 |
| 2003/0210248 A1* | 11/2003 | Wyatt | 345/541 |
| 2005/0114586 A1 | 5/2005 | Brice, Jr. et al. | |
| 2005/0114620 A1* | 5/2005 | Justen | 711/170 |
| 2008/0244222 A1 | 10/2008 | Supalov et al. | |

* cited by examiner

*Primary Examiner* — John Lane
(74) *Attorney, Agent, or Firm* — Maxine L. Barasch; Keohane & D'Alessandro, PLLC

(57) ABSTRACT

Embodiments of the present invention provide an approach for memory and process sharing via input/output (I/O) with virtualization. Specifically, embodiments of the present invention provide a circuit design/system in which multiple chipsets are present that communicate with one another via a communications channel. Each chipset generally comprises a processor coupled to a memory unit. Moreover, each component has its own distinct/separate power supply. Pursuant to a communication and/or command exchange with a main controller, a processor of a particular chipset may disengage a memory unit coupled thereto, and then access a memory unit of another chipset (e.g., coupled to another processer in the system). Among other things, such an inventive configuration reduces memory leakage and enhances overall performance and/or efficiency of the system.

20 Claims, 8 Drawing Sheets

MEMORY AND PROCESS SHARING ACROSS MULTIPLE CHIPSETS VIA INPUT/OUTPUT WITH VIRTUALIZATION

FIELD OF THE INVENTION

In general, embodiments of the present invention provide a multiple chipset circuit design. Specifically, embodiments of the present invention provide an approach for memory and process sharing via input/output (I/O) with virtualization.

BACKGROUND OF THE INVENTION

With increasing demands on functionality and performance as well as improved fabrication techniques, newer generations of processors and other integrated circuits have significantly higher levels of integration than their predecessors. Additionally, in some instances, different market segments may exist for compatible versions of processors and other types of integrated circuits having price and performance characteristics specific to a particular market segment. However, given the complexity and expense of designing a single version of a processor or other integrated circuit having a large transistor count, it may be impractical to separately design and manufacture a processor for each of several different market segments.

These issues may be compounded as mobile devices become more pervasive. Specifically, mobile systems typically suffer from power leakage and consumption of their internal circuits. Currently, low-power circuits are based on conventional design schemes. Moreover, mobile multi-core processor and multi-chip systems require a fundamentally different design approach for cores and on-chip memories. Under such configurations, multiple chipsets may be utilized in a single system, with each chipset requiring separate memory resources. Such scattered memory resources may lead to extensive power leakage.

Heretofore, attempts have been made in providing improved circuitry. Such attempts include the following:

U.S. Patent Application Publication No. US 2008/0244222 discloses a method for virtual processing.

U.S. Patent Application Publication No. US 2005/0114586 discloses a method of performing memory mapped input/output operations to an alternate address space.

U.S. Pat. No. 7,984,122 discloses an approach in which processor core data regarding a client device is received from the client device.

U.S. Pat. No. 7,873,776 discloses a multiple-core processor with support for multiple processors.

U.S. Pat. No. 7,849,327 discloses a technique to improve the performance of virtualized input/output (I/O) resources of a microprocessor within a virtual machine environment.

U.S. Pat. No. 7,552,436 discloses a method of performing memory mapped input/output operations to an alternate address space.

Unfortunately, none of these approaches addresses issues such as power leakage and/or consumption for multiple chipset designs.

SUMMARY OF THE INVENTION

In general, embodiments of the present invention provide an approach for memory and process sharing via input/output (I/O) with virtualization. Specifically, embodiments of the present invention provide a circuit design/system in which multiple chipsets are present that communicate with one another via a communications channel. Each chipset generally comprises a processor coupled to a memory unit. Moreover, each component has its own distinct/separate power supply. Pursuant to a communication and/or command exchange with a main controller, a processor of a particular chipset may disengage a memory unit coupled thereto, and then access a memory unit of another chipset (e.g., coupled to another processer in the system). Among other things, such an inventive configuration reduces memory leakage and enhances overall performance and/or efficiency of the system.

A first aspect of the present invention provides a circuit having multiple chipsets, comprising: a first chipset having a first processor and a first memory unit; a second chipset having a second processor and a second memory unit; and a communication channel coupling the first chipset to the second chipset, wherein the first processor is configured to disengage the first memory unit and to access the second memory unit, and wherein the second processor is configured to disengage the second memory unit and to access the first memory unit.

A second aspect of the present invention provides a system having multiple chipsets, comprising: a main controller; a first chipset in communication with the main controller, the first chipset having a first processor coupled to a first power supply and a first memory unit coupled to a second power supply; a second chipset in communication with the main controller, the second chipset having a second processor coupled to a third power supply and a second memory unit coupled to a fourth power supply; and a communication channel coupling the first chipset to the second chipset, wherein the first processor is configured to disengage the first memory unit and to access the second memory unit, and wherein the second processor is configured to disengage the second memory unit and to access the first memory unit.

A third aspect of the present invention provides a method for virtualizing memory within a circuit, comprising: receiving a request from a main controller on a first processor of a first chipset; communicating a first set of data from the first processor to the main controller in response to the request; receiving a command on the first processor in response to the first set of data; disengaging a first memory unit of the first chipset in response to the command, the first memory unit being coupled to the first processor; and accessing a second memory unit of a second chipset from the first processor in response to the disengaging of the first memory unit, the second memory unit being coupled to a second processor within the second chipset.

BRIEF DESCRIPTION OF THE DRAWINGS

These and other features of this invention will be more readily understood from the following detailed description of the various aspects of the invention taken in conjunction with the accompanying drawings in which.

Figure 1:
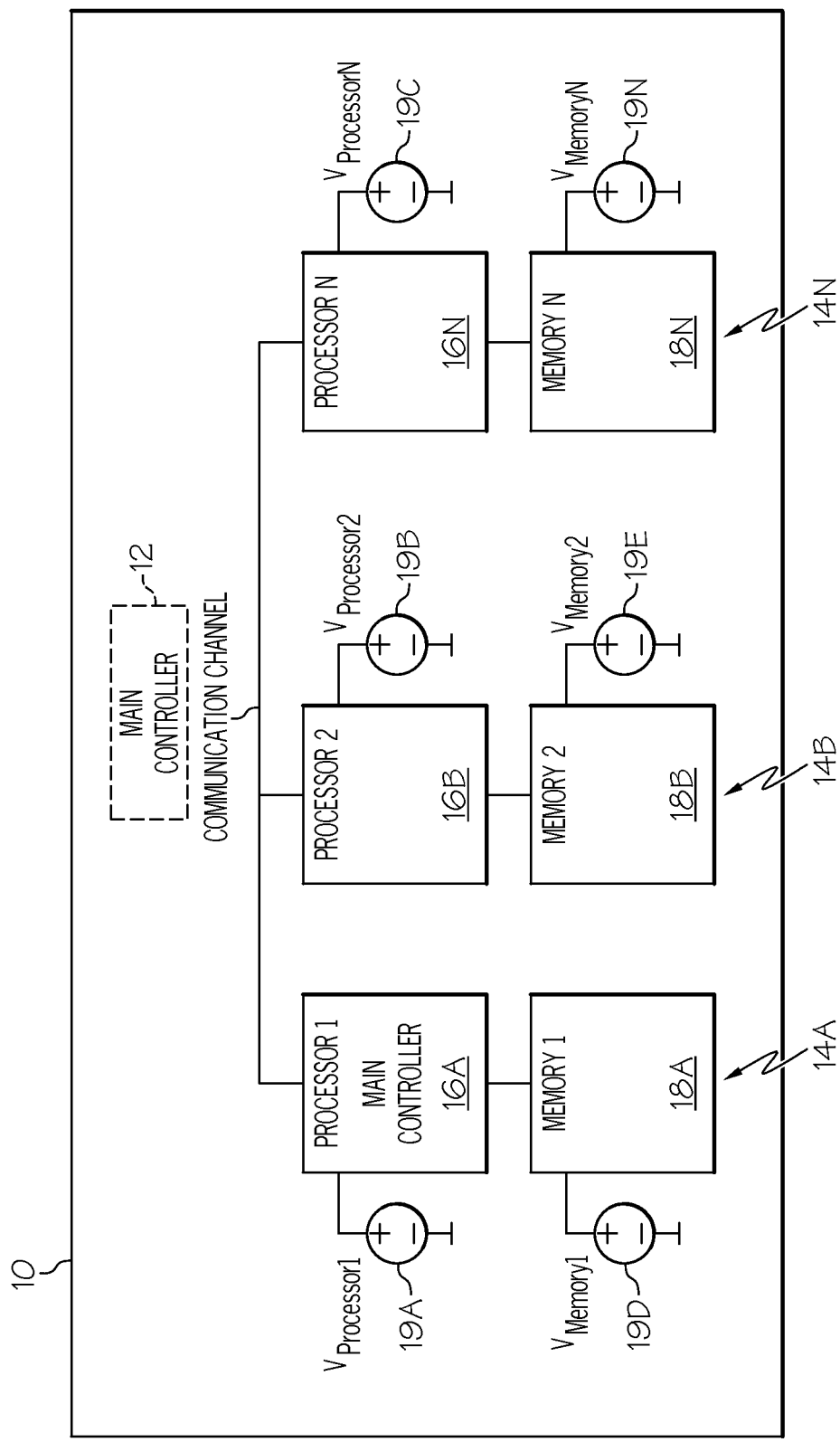
FIG. 1 depicts a diagram of chipset system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for memory and process sharing via input/output (I/O) with virtualization. Specifically, embodiments of the present invention provide a circuit design/system in which multiple chipsets are present that communicate with one another via a communications channel. Each chipset generally comprises a processor coupled to a memory unit. Moreover, each component has its own distinct/separate power supply. Pursuant to a communication and/or command exchange with a main controller, a processor of a particular chipset may disengage a memory unit coupled thereto, and then access a memory unit of another chipset (e.g., coupled to another processer in the system). Among other things, such an inventive configuration reduces memory leakage and enhances overall performance and/or efficiency of the system.

As used herein, virtualization of resources refers to any number of techniques used to share computing resources among a number of systems and/or software applications (collectively referred to as "guest" software or entity). Virtualization techniques can broadly be categorized as employing a "dedicated policy", in which computing hardware is partitioned and each partition is dedicated to particular guest software, or a "shared policy", in which computing hardware is allocated to guest software according to some arbitration scheme, such as a time-based allocation algorithm (e.g., "time multiplexing").

Referring now to FIG. 1, a circuit system/design 10 according to an embodiment of the present invention is shown. As depicted, system 10 comprises chipsets 14A-N each having a processor 16A-N that is coupled to a memory unit 18A-N. Further, each component (e.g., processors 16A-N and memory unit 18A-N) has its own distinct/separate power supply 19A-N. As further shown, one of the processors (in this case processor 16A) can function and/or be assigned main controller duties. Alternatively, system 10 can comprise a distinct main controller 12 with which processors 16A-N communicate. Still yet, each chip set 16A-N may communicate with one another via a communications channel, which can be any type of communication channel now known or hereafter developed.

Under the embodiments of the present invention, communication between chipsets 14A-N may include data pertaining to memory resources, throughput, performance, power, etc. As indicated above, a single chipset (e.g., 14A) may take a controller and/or moderator role. Under such a configuration, the controller powers on and off (e.g., engages and/or disengages) individual chipsets and the memory associated therewith. Is general, processes and memory addresses are virtualized between chipsets 14A-N. Moreover, processing and memory resources may be delegated between chipsets 14A-N.

Under the embodiments of the present invention, memory units/blocks 18A-N may be diverse in size, performance, and/or power. Under previous approaches, power consumption and leakage though all components were extensive. Under the present invention, processors 16B-N report to controller 16A (or 12) about the respective processor 16B-N, subsystem specifications, and statuses through chip-to-chip or module-to-module communication channel, such Hyper Transport (HT), Quick Path Interconnect (QPI), SPI (Serial Peripheral Interface Bus), Peripheral Component Interconnect Express (PCIe), etc. The main processor 16A polls data and, in response, processors 16B-N report events and requirements such as memory type, memory size, data latency, data rate, power, utilization, etc.

Figure 2:
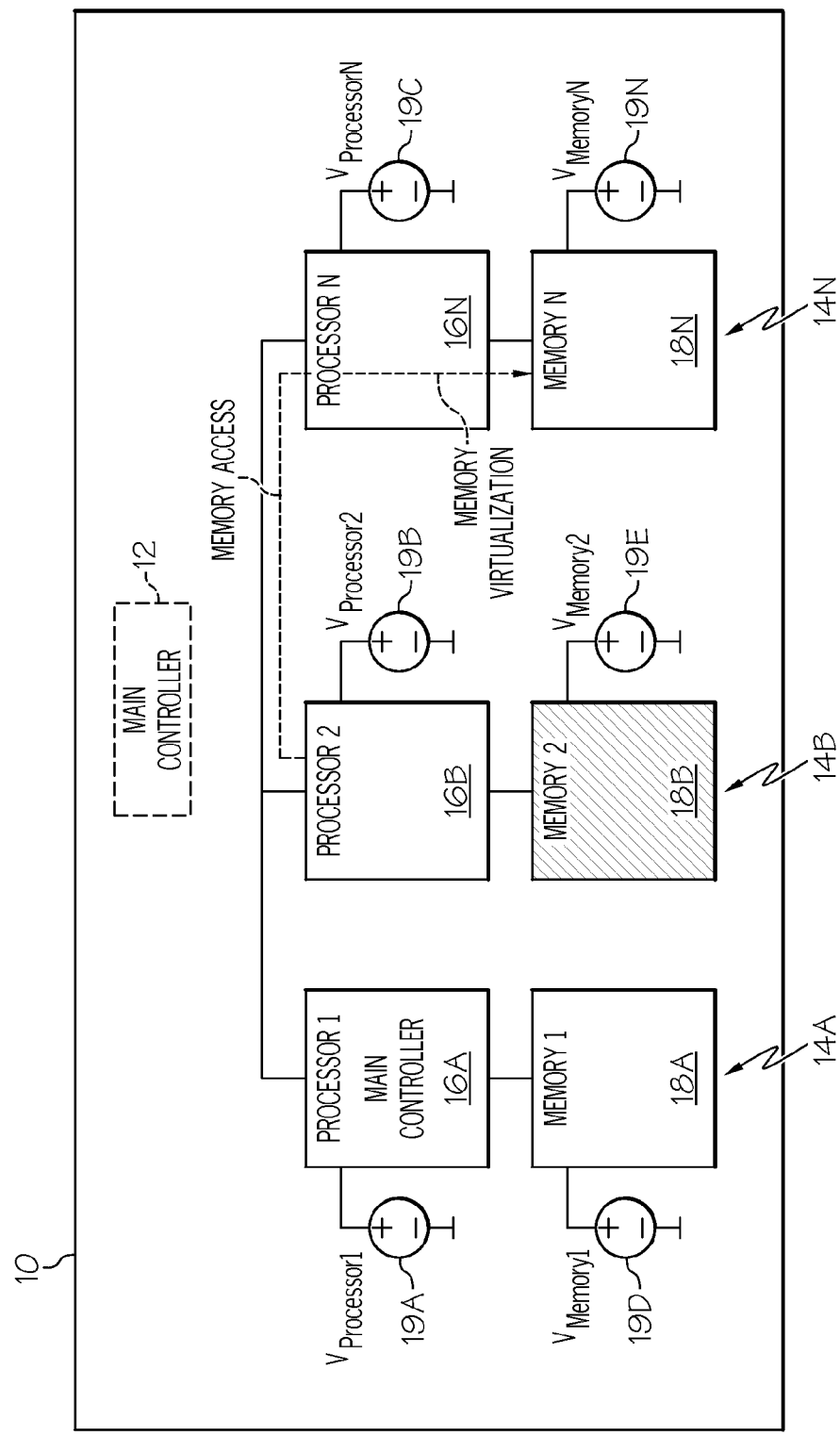
FIG. 2 depicts a diagram of a chipset system in a first mode according to an embodiment of the present invention.

Referring now to FIG. 2, system 10 is shown when system 10 is placed in a low-power mode for low-performance processing. As depicted, memory unit 18B was disengaged (e.g., in response to communication of data from processor 16B to main controller 18A (or 12), and receipt of a subsequent command from controller 16A (or 12) in response thereto. Under such an embodiment, processor 16B would access the memory unit of another chipset such as memory unit 18N of chipset 14N. In general, main controller 16A (or 12) determines which memory units to turn off based on power and performance requirements versus processor and memory specifications. Memory power supply is controlled by the processor to which it is coupled. The processor receives command on memory module power supply from the main controller. Processor power supply is controlled by the main controller 16A or 12. In this example, processor 16N virtualizes memory space in memory unit 18N for processor 16B, and enables virtualized memory access. Before memory unit 18B is disengaged/shutdown (e.g., by disengaging power supply 19E), existing memory contents are transferred to memory unit 18N. This configuration conserves power and prevents power leakage.

Figure 3:
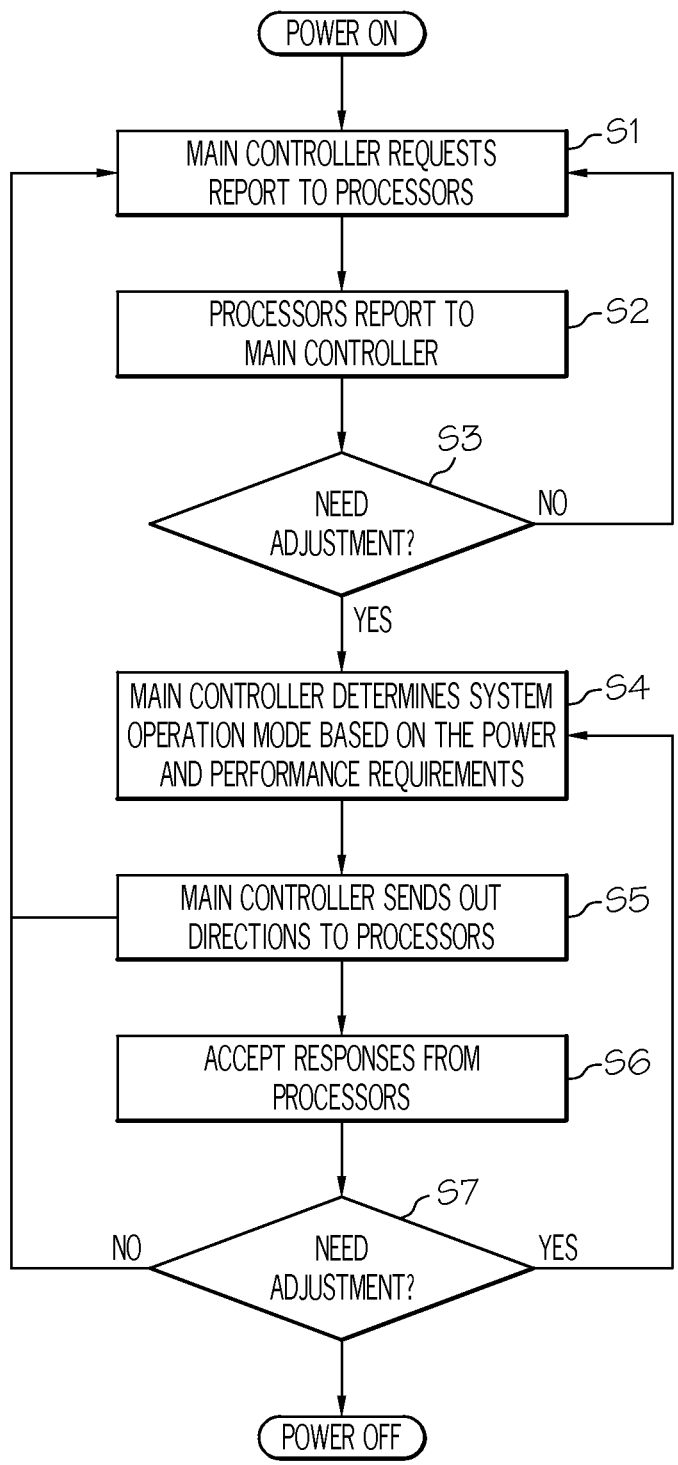
FIG. 3 depicts a method flow diagram according to an embodiment of the present invention.

Referring now to FIG. 3, a method flow diagram according to an embodiment of the present invention is shown. As shown, in step S1, the main controller sends a request for reports to the processors in the system. In step S2, the processors send the request reports to the main controller. In step S3, the main controller determines whether an adjustment is needed. If not, the process can return to step S1 for cycling. If so, the main controller determines the system operation mode based on power and performance requirements, and then in step S5, sends directions/commands to the processors of the chipsets. In step S6, the processors send responses to the main controller where they are analyzed. In step S7, the main controller determines from the responses whether a further adjustment is needed. If not, the process returns to step S1. If so, the process returns to step S4. If no, power off.

Figure 4:
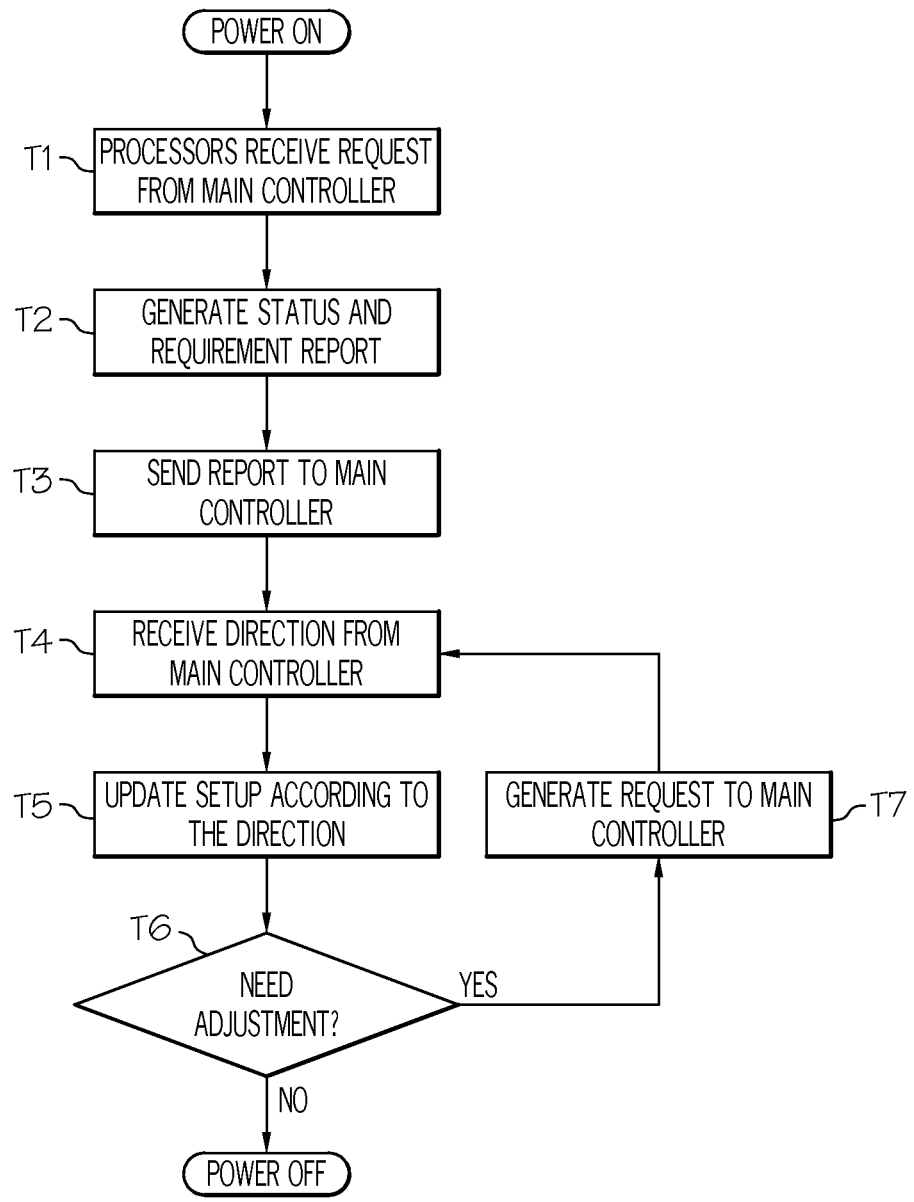
FIG. 4 depicts another method flow diagram according to an embodiment of the present invention.

Referring now to FIG. 4, another method flow diagram according to an embodiment of the present invention is shown. As shown, in step T1, a processor receives a request from a main controller. In step T2, the processor generates a status and requirement report in response to the request. In step T3, the processor sends the report to the main controller. In step T4, the processor receives direction/commands from the main controller. In step T5, the processor updates the setup according to the direction/commands received from the main controller. In step T6, it is determined (e.g., by the processor) whether an adjustment is needed. If so, a corresponding request is sent to the main controller in step T7, and the process returns to step T4.

Figure 5:
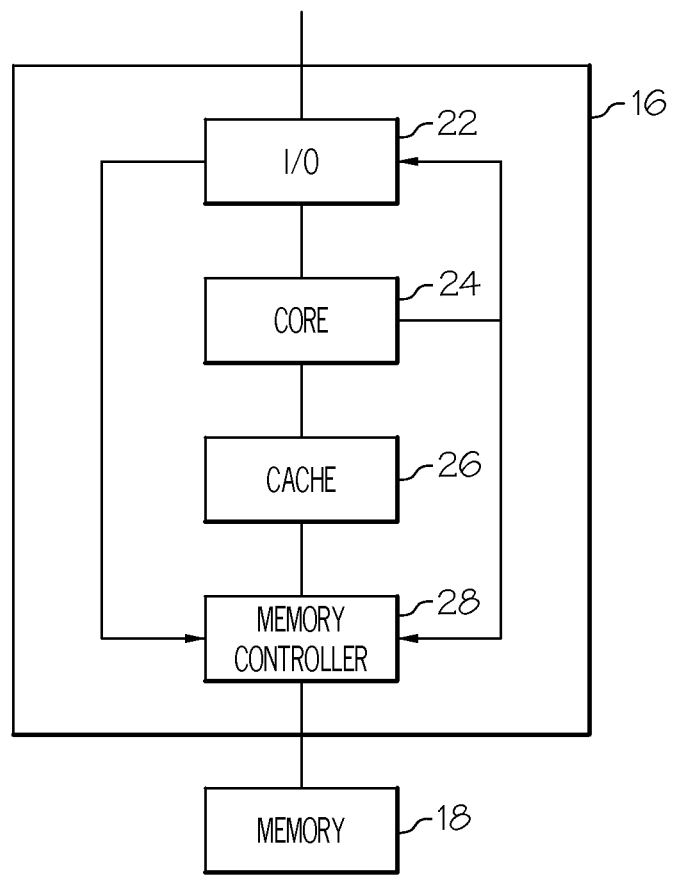
FIG. 5 depicts a diagram of a processor according to an embodiment of the present invention.

Referring now to FIG. 5, a more detailed diagram of a processor 16 according to an embodiment of the present invention is shown. Specifically, FIG. 5 depicts the virtualization of memory access hereunder. As shown, each processor 16 may comprise an I/O 22 coupled to a core unit 24 that is coupled to a cache unit 26. The cache unit 26 is itself coupled to a memory controller 28 that is coupled to a memory unit 18. Under this embodiment, I/O 22 may have DMA (Direct Memory Access) for internal and external services. Based on the main controller's direction, core unit 24 may establish DMA and a virtualized address space table. When a memory access request is received from another processor, I/O unit 22 may directly access memory unit 18 and respond via I/O unit 22. Core unit 24 further negotiates with the main controller to adjust virtualized memory size and mapping. If necessary, core unit 24 transfers virtualized memory contents to a memory unit other than the original memory unit.

Figure 6:
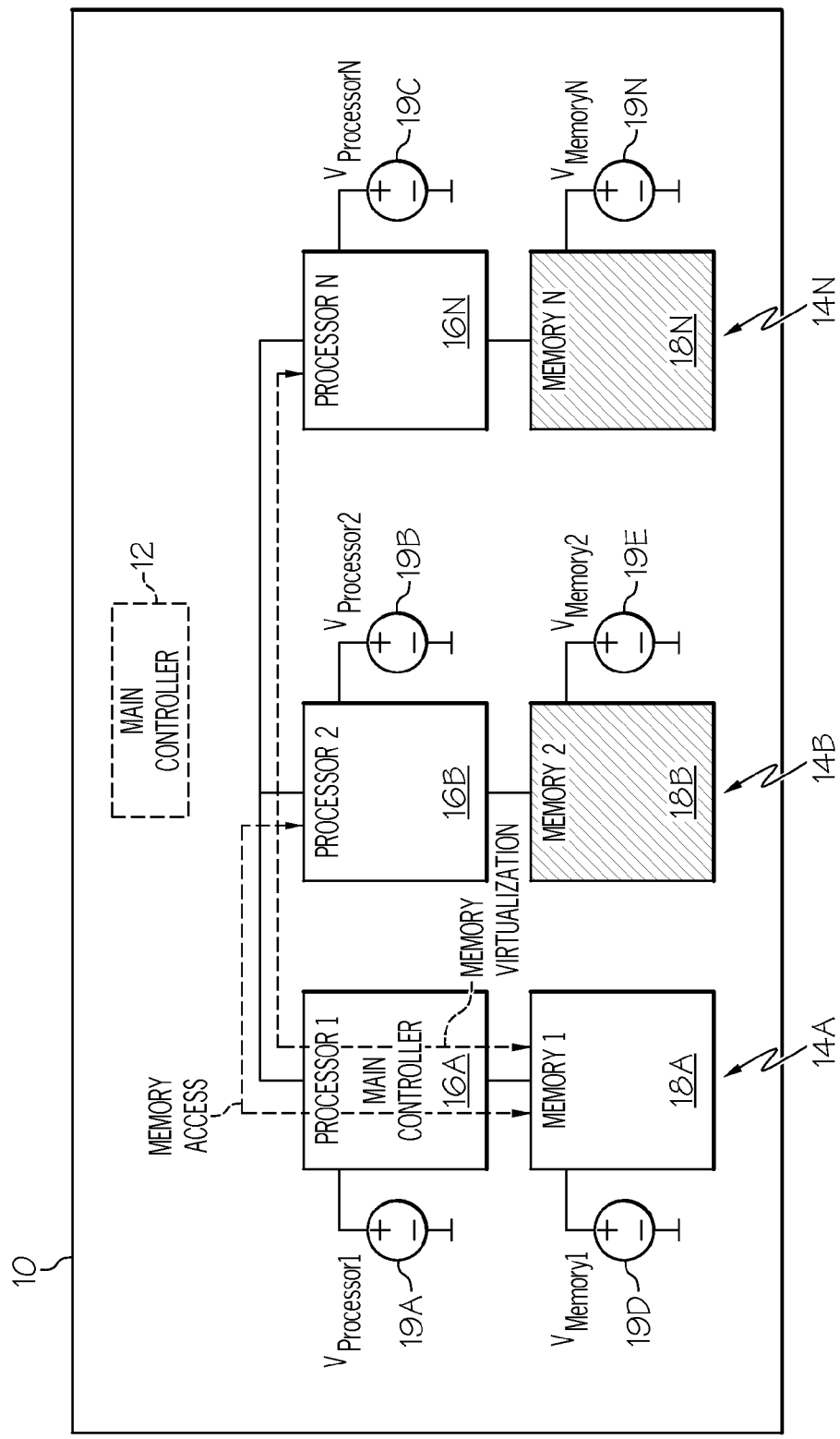
FIG. 6 depicts a diagram of a chipset in a second mode according to an embodiment of the present invention.

Referring now to FIG. 6, an example of multiple processors-to-one memory mapping in accordance with an embodiment of the present invention is shown. As depicted, system 10 comprises the components shown and described above in conjunction with FIG. 1 such as chipsets 14A-N, processors 16A-N, memory units 18A-N, power supplies 19A-N, and optional main controller 12. In this example, it is assumed that memory unit 18A is relatively larger than memory units 18B-N and serves processors 16B-N through virtualization. Under this embodiment, memory units 18B-N are shutdown/disengaged after the multiple-to-one virtualized mapping is performed (e.g., by main controller 16A or 12).

Figure 7:
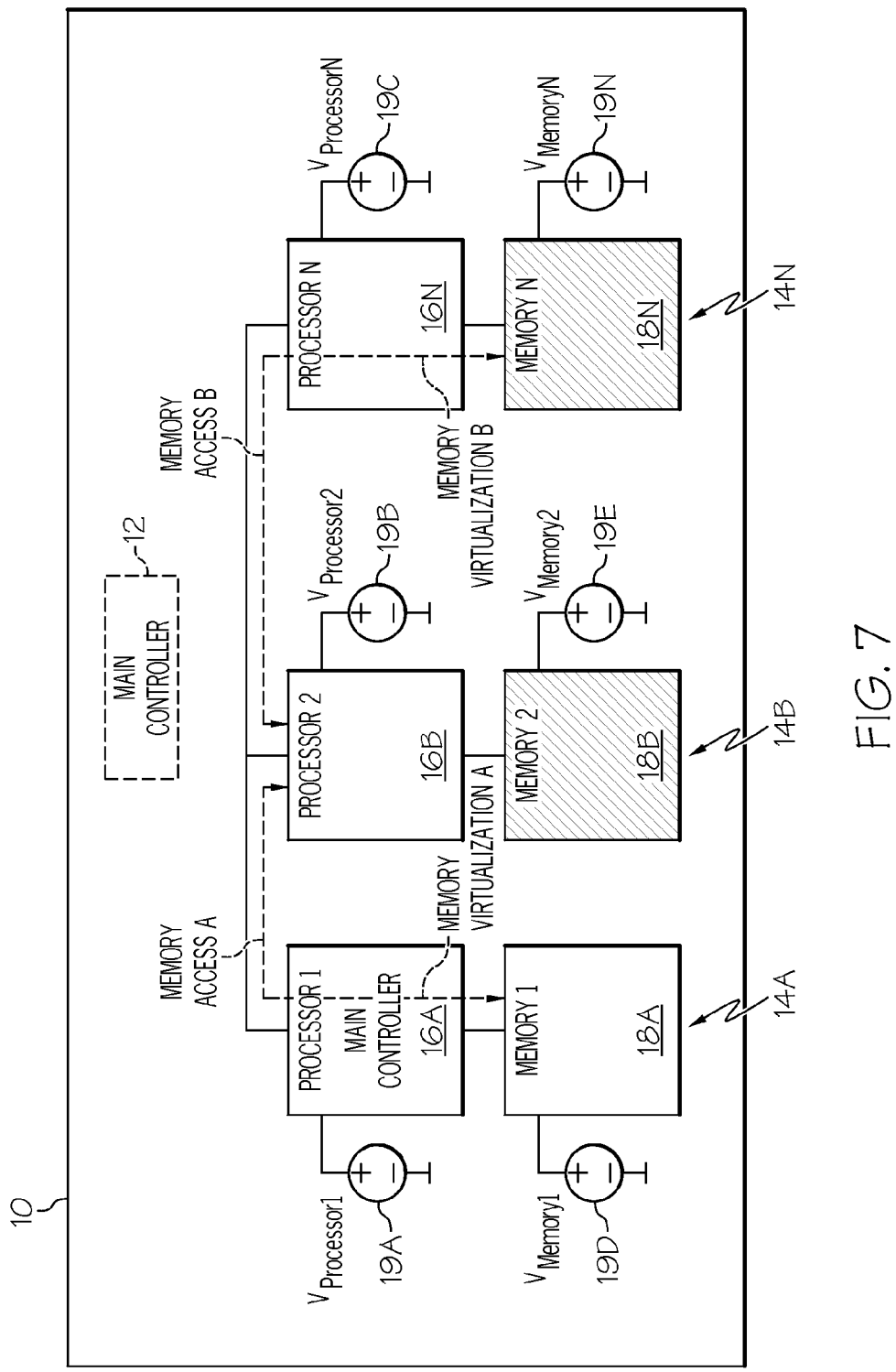
FIG. 7 depicts a diagram of a chipset in a third mode according to an embodiment of the present invention.

FIG. 7 shows an example of one processor-to-multiple memory mapping in accordance with an embodiment of the present invention. As depicted, system 10 comprises the components shown and described above in conjunction with FIG. 1 such as chipsets 14A-N, processors 16A-N, memory units 18A-N, power supplies 19A-N, and optional main controller 12. Depending on the address space assigned, memory virtualization may be divided between multiple processors and memory units. When processor 16B's memory requirement grows beyond a capacity available in processor 16A through memory access/virtualization A, processor 16B extends to memory access/virtualization B through processor 16N. Such access can be shrunk to single or reduce number of access when requirement decreases, with memory virtualization consolidation.

Figure 8:
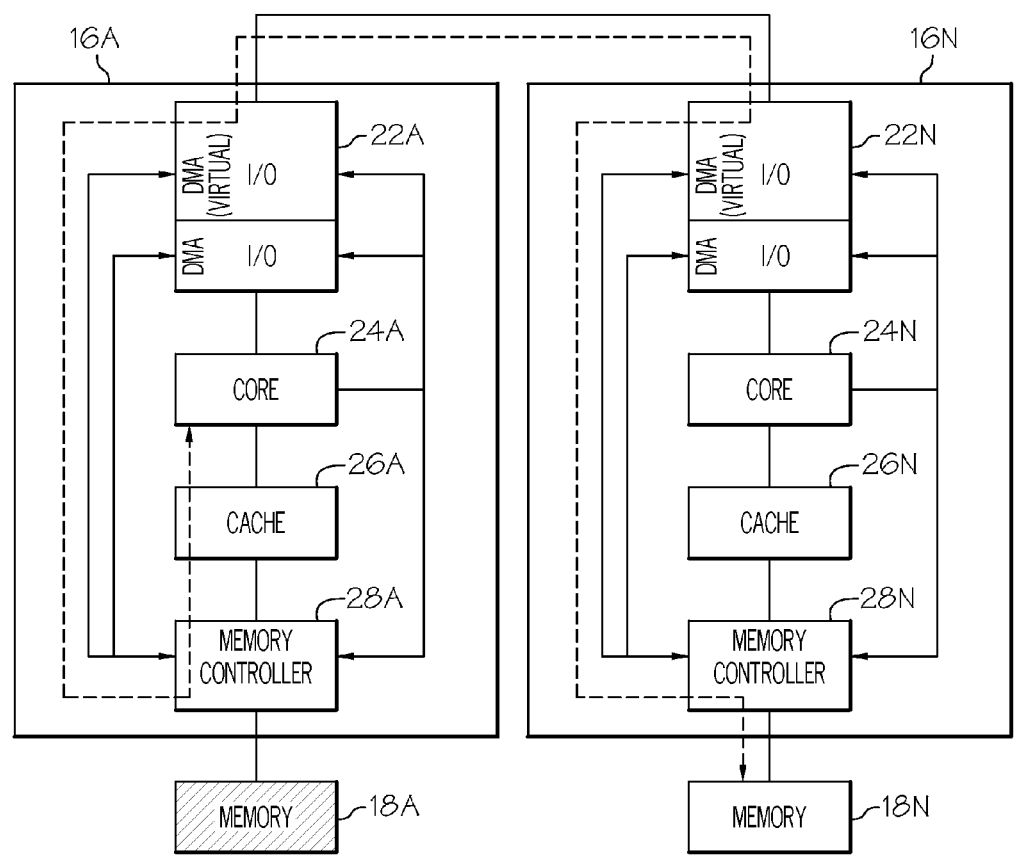
FIG. 8 depicts a diagram of multiple processors in communication with one another according to an embodiment of the present invention.

Referring now to FIG. 8, an example of a direct DMA-I/O-DMA transaction with virtualization is depicted. As depicted, processors 16A-N each comprise the components described above such as I/O units 22A-N, core units 24A-N, cache units 26A-N, and memory controllers 28A-N that communicate with memory units 18A-N. Under this embodiment, core units 24A-N establish virtualized DMA in accordance with the main controller's policy. Virtualized DMA may then function directly without involvement of core units 24A-N. Such a configuration reduces latency and participating cores' memory-related loading.

As described hereinabove, the embodiments of the present invention allow for main controller delegation. Under such embodiments, main controller function is delegated to lower-power consuming processors when needed. The power-performance budget of the processors may be determined during system design. Under this configuration, the main controller and operating system maintain (among other things) the power and performance budget(s) and a list of processors, as well as scenario and sequence of power-performance tradeoffs. Typically, the main controller follows predetermined power saving policies.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A circuit having multiple chipsets, comprising:
   a first chipset having a first processor and a first memory unit, the first memory unit being associated with a first power supply;
   a second chipset having a second processor and a second memory unit, the second memory unit being associated with a second power supply; and
   a communication channel coupling the first chipset to the second chipset, wherein the first processor is configured to disengage the first power supply associated with the first memory unit and to access the second memory unit, and wherein the second processor is configured to disengage the second power supply associated with the second memory unit and to access the first memory unit.

2. The circuit of claim 1, the first processor and the second processor configured to communicate with a main controller.

3. The circuit of claim 2, the first processor and the second processor each comprising:
   an input/output (I/O) unit;
   a core unit coupled to the I/O unit;
   a cache unit coupled to the core unit; and
   a memory controller coupled to the cache unit.

4. The circuit of claim 3, the I/O unit having direct memory access (DMA) for internal and external services.

5. The circuit of claim 3, the core unit being configured to negotiate with the main controller to adjust a virtualized memory size and perform memory mapping for the circuit.

6. The circuit of claim 1, wherein processes and memory addresses are virtualized between the first chipset and the second chipset.

7. The circuit of claim 1, wherein the first processor, the first memory unit, the second processor, and the second memory unit each has a separate power supply.

8. The circuit of claim 1, the first processor and the second processor each being configured to poll data within the circuit.

9. The circuit of claim 8, the data pertaining to at least one of the following: memory type, memory size, communication latency, data rate, available power, and memory utilization.

10. A system having multiple chipsets, comprising:
   a main controller;
   a first chipset in communication with the main controller, the first chipset having a first processor coupled to a first power supply and a first memory unit coupled to a second power supply;
   a second chipset in communication with the main controller, the second chipset having a second processor coupled to a third power supply and a second memory unit coupled to a fourth power supply; and
   a communication channel coupling the first chipset to the second chipset, wherein the first processor is configured to disengage the second power supply from the first memory unit and to access the second memory unit, and wherein the second processor is configured to disengage the fourth power supply from the second memory unit and to access the first memory unit.

11. The system of claim 10, the first processor and the second processor each comprising:
   an input/output (I/O) unit;
   a core unit coupled to the I/O unit;
   a cache unit coupled to the core unit; and
   a memory controller coupled to the cache unit.

12. The system of claim 11, the I/O unit having direct memory access (DMA) for internal and external services.

13. The system of claim 11, the core unit being configured to negotiate with the main controller to adjust a virtualized memory size and perform memory mapping for the system.

14. The system of claim 10, wherein processes and memory addresses are virtualized between the first chipset and the second chipset.

15. The circuit of claim 10, the first processor and the second processor each being configured to poll data within the system.

16. The circuit of claim 15, the data pertaining to at least one of the following: memory type, memory size, communication latency, data rate, available power, and memory utilization.

17. A method for virtualizing memory within a circuit, comprising:
   receiving a request from a main controller on a first processor of a first chipset;
   communicating a first set of data from the first processor to the main controller in response to the request;
   receiving a command on the first processor in response to the first set of data;
   shutting down the first memory unit by disengaging a power supply from a first memory unit of the first chipset in response to the command, the first memory unit being coupled to the first processor; and
   accessing a second memory unit of a second chipset from the first processor in response to the disengaging of the power supply from first memory unit, the second memory unit being coupled to a second processor of the second chipset.

18. The method of claim 17, the accessing occurring via a communication channel coupling the first chipset to the second chipset.

19. The method of claim 17, the first processor, the first memory unit, the second processor, and the second memory unit each being coupled to a separate power supply.

20. The method of claim 17, the first processor and the second processor each comprising:
   an input/output (I/O) unit;
   a core unit coupled to the I/O unit;
   a cache unit coupled to the core unit; and
   a memory controller coupled to the cache unit.

* * * * *